United States Patent [19]
FitzGerald

[11] Patent Number: 5,542,750
[45] Date of Patent: Aug. 6, 1996

[54] WHEEL COVER ASSEMBLY RETAINER RING

[75] Inventor: David J. FitzGerald, San Leandro, Calif.

[73] Assignee: Wheelmasters, Inc., Reno, Nev.

[21] Appl. No.: 249,543

[22] Filed: May 26, 1994

[51] Int. Cl.$^6$ ........................................ B60B 7/14
[52] U.S. Cl. ........................... 301/37.37; 321/37.31; 321/108.4
[58] Field of Search ................ 301/37.1, 37.21, 301/37.31, 37.37, 108.1, 108.4, 35.62

[56] References Cited

U.S. PATENT DOCUMENTS

| | | |
|---|---|---|
| Re. 33,806 | 1/1992 | Wang et al. . |
| 4,606,582 | 8/1986 | Warren ................................ 301/37.37 |
| 4,725,100 | 2/1988 | Patti . |
| 4,925,249 | 5/1990 | Auspelmyer ..................... 301/35.62 X |
| 5,031,965 | 7/1991 | Bueger .................................. 301/37.37 |
| 5,052,758 | 10/1991 | Patti et al. . |
| 5,167,440 | 12/1992 | FitzGerald . |

FOREIGN PATENT DOCUMENTS

| | | | |
|---|---|---|---|
| 2451071 | 4/1976 | Germany ............................. 301/37.37 |
| 4085102 | 3/1992 | Japan .................................... 301/37.31 |
| 2224702 | 5/1990 | United Kingdom ................ 301/37.31 |

*Primary Examiner*—Russell D. Stormer
*Attorney, Agent, or Firm*—David H. T. Wayment

[57] ABSTRACT

A retainer ring for wheel cover assemblies for heavy vehicle wheel rims which mount on lug bolts and are held in place by lug nuts including a universal retainer ring which has a multiplicity of adaptor openings to engage a variety of lug bolt and nut patterns and without removal of lug nuts and is secured in place by cam locks.

14 Claims, 3 Drawing Sheets

WHEEL COVER ASSEMBLY RETAINER RING

BACKGROUND OF THE INVENTION

1. Field of the Invention

The present invention relates to wheel cover assemblies for heavy vehicle wheel rims. More particularly, the present invention relates to a retainer ring which is formed to engage either the chamfered sides of the wheel rim lug nuts or the free ends of the lug bolts of a multiplicity of heavy vehicle wheel rim bolt patterns whereby wheel cover assemblies can be attached thereto and removed without loosening the wheel rim lug nuts.

2. Description of the Prior Art

Decorative wheel covers have long been used by operators of heavy vehicles for improving the appearance of the apparatus to attract customers and to improve the image of heavy vehicle operators in public opinion.

An example of this type of improvement in the art is disclosed in U.S. Pat. No. Re. 33,806, issued Jan. 28, 1992, to Mike Wang et al. Disclosed therein is a wheel cover which mounts over the lug bolts of a heavy vehicle wheel rim and is held in place by a retainer ring that is secured in position by the wheel retaining lug nuts. The retainer ring is captured between the lug nuts and the wheel rim. Adapters are utilized to cover the lug nuts with an additional decorative cover ring.

The problem with this type of prior art design is that the retainer ring is interposed into the wheel to lug nut retention relationship, and it requires the lug nuts to be removed from the wheel rim to remove the decorative cover. That is undesirable because the arrangement creates a perceived safety hazard by interfering with the lug nut to wheel integrity. Moreover, the arrangement is impractical because it is usually necessary to jack the vehicle to take the weight of the wheel in order to remove the lug nuts to remove the wheel cover.

In view of the increasing frequency of safety checks being performed by traffic regulators throughout the United States and Europe, it has been recognized and demonstrated that there is a need in the art for a wheel cover assembly which maintains wheel to lug nut integrity and provides a quick change wheel cover that does not require the removal of the lug nuts from the lug bolts to remove the wheel cover from the rim.

An example of a removable wheel cover which improves on the prior art and provides a quick change capability that does not require the removal of the wheel lug nuts is disclosed in U.S. Pat. No. 5,167,440 issued Dec. 1, 1992, to Fitzgerald, the present inventor. Disclosed therein is a means for securing a wheel cover to a heavy vehicle wheel rim which is quickly removable simply by the loosening of screws. While the disclosed solution is satisfactory for certain purposes, other types of wheel covers require alternative means of securing a wheel cover to a heavy vehicle wheel rim which is universally adaptable to numerous different types of trucks and wheel bolt patterns.

The present invention is primarily a safety device which provides a universal solution to the described problems. It provides a retainer ring and wheel cover assembly of a unique and novel design which retains lug nut to wheel rim Integrity and permits the quick change of wheel cover assemblies without the removal of lug nuts.

SUMMARY OF THE INVENTION

The present invention is a wheel cover assembly retainer ring primarily for heavy vehicle wheel rims which mount on lug bolts and are held in place by lug nuts. The ring is a generally flat disk formed for engaging alternatively either the chamfered sides of lug nuts or the free ends of lug bolts of a multiplicity of wheel bolt patterns. Cam locks hold the ring disks in engagement with the lug bolts or nuts. Means are provided for securing a wheel cover assembly to the ring disk.

The present invention also includes a wheel cover assembly primarily for vehicle wheel rims which mount on lug bolts and are held in place by lug nuts. It comprises a universal retainer ring which has a multiplicity of adapter openings formed in a circular pattern to permit said ring to engage a multiplicity of truck or wheel lug bolt and nut patterns without being captured between a lug nut and the wheel rim. The ring includes pivotable cam locks which hold the ring in engagement with the lug bolts or nuts. A hub cover is engaged to the retainer ring by quick release means.

OBJECTS OF THE INVENTION

It is therefore an important object of the present invention to provide a new and novel quick change wheel cover assembly for vehicle wheel rims.

It is another object of the present invention to provide a retainer ring for a wheel cover assembly for vehicle wheel rims which permits the wheel covers to be removed without removing the lug nuts from the wheel lug bolts.

It is a further object of the present invention to provide a universal retainer ring which can be secured to a multiplicity of vehicle wheel lug bolt and nut patterns whereby a wheel cover can be universally secured to a variety of different make wheel rims.

It is still another object of the present invention to provide a retainer ring for vehicle wheel cover assemblies which engages either the lug bolt free ends or the chamfered sides of the lug nuts without loosening the lug nuts.

It is still a further object of the present invention to provide a wheel cover assembly which integrates a wheel cover for a heavy vehicle wheel rim with a hub cover which is formed to cover the center portion of the wheel and attaches to a universal adapter ring and bears against the wheel cover portion to hold it in place.

Other objects and advantages of the present invention will become apparent when the apparatus of the present invention is considered in conjunction with the accompanying drawings.

DESCRIPTION OF THE PREFERRED EMBODIMENT

Reference is made to the drawings for a description of the preferred embodiment of the present invention wherein like reference numbers represent like elements on corresponding views.

Figure 1:
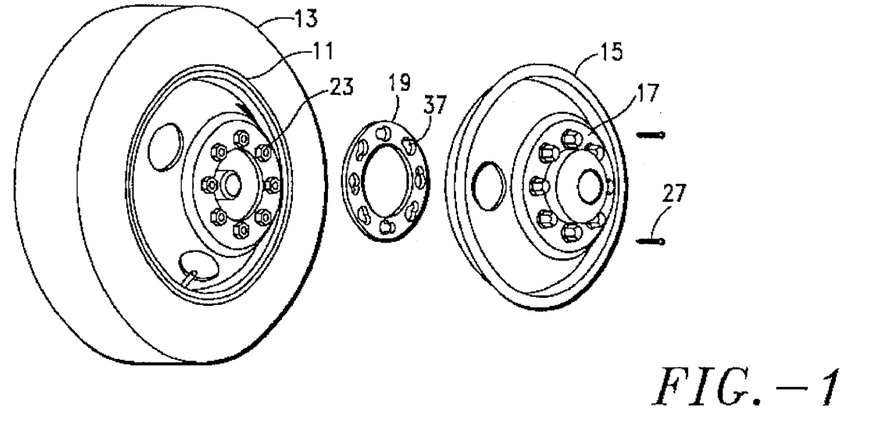
FIG. 1 is an exploded perspective view of a heavy vehicle wheel and wheel cover assembly showing the retainer ring of the present invention and an integrated wheel and hub cover unit.
Figure 2:
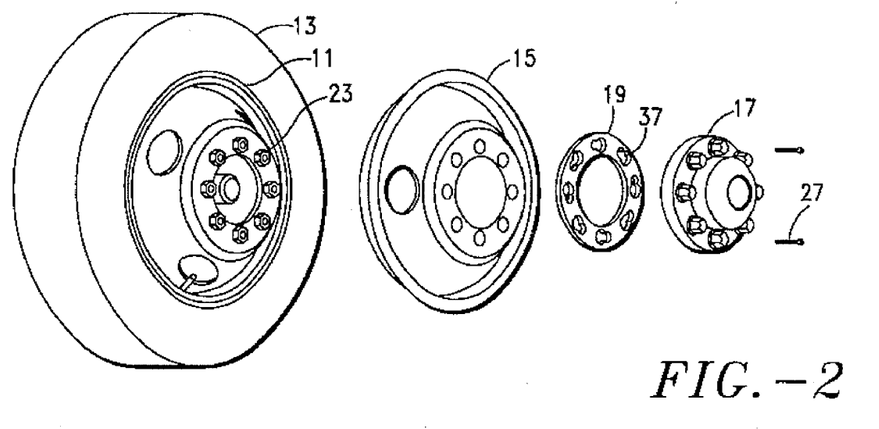
FIG. 2 is an exploded perspective view similar to FIG. 1 showing a first assembly configuration with separate wheel and hub covers.
Figure 3:
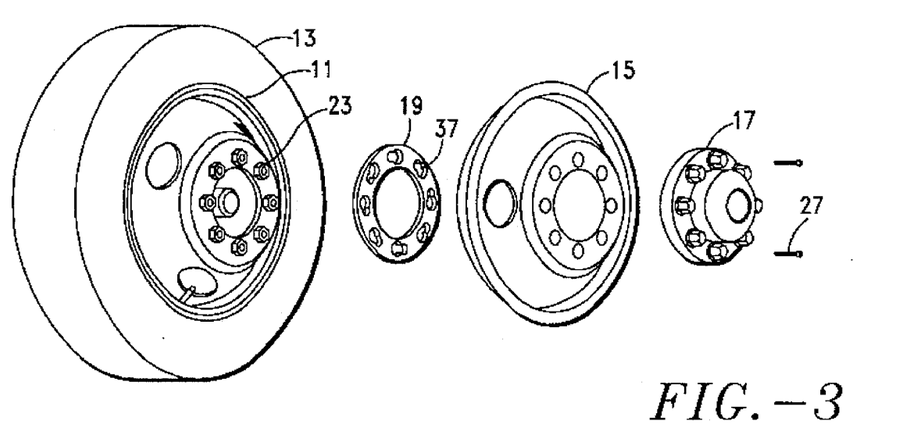
FIG. 3 is an alternative assembly of FIG. 2.
Figure 4:
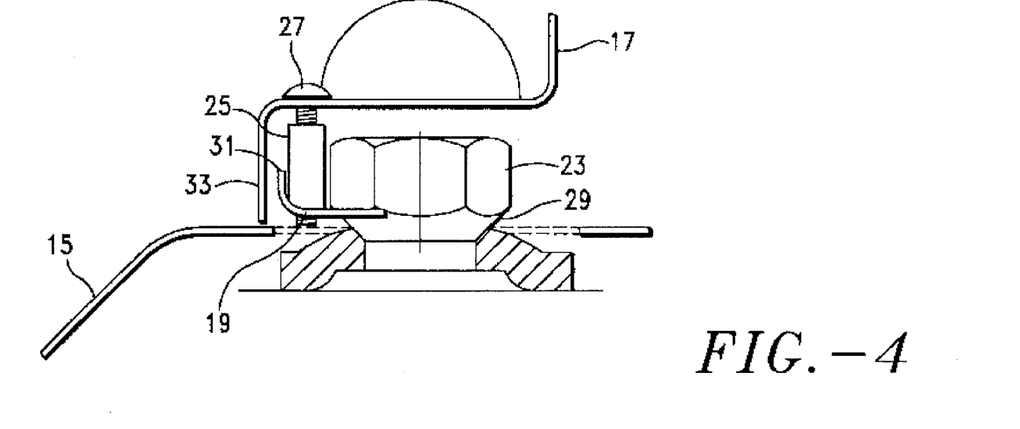
FIG. 4 is a broken out partial section showing the wheel cover assembly of the present invention engaged with a General Motors wheel.
Figure 5:
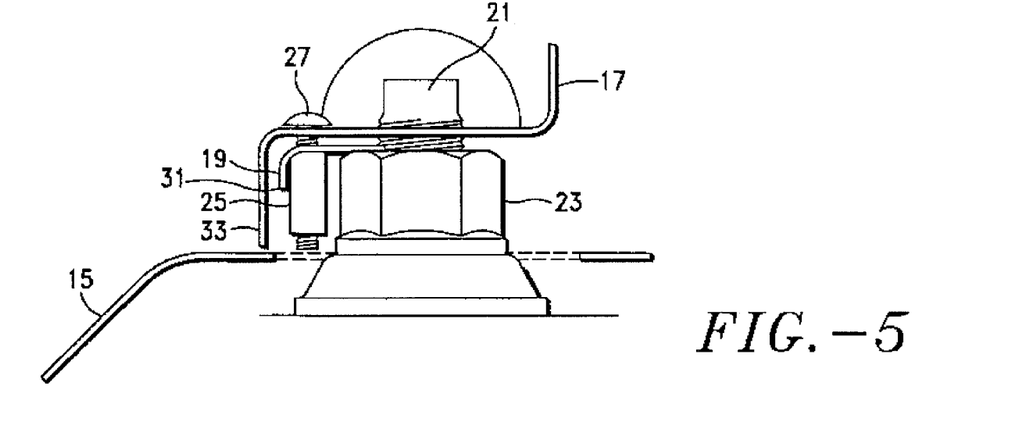
FIG. 5 is the assembly of FIG. 4 engaged with a 1984 and later Ford, and a 1994 and later Dodge wheel.

FIGS. 1–3 illustrate the various arrangements of the assembly of parts of the present invention depending upon the make of vehicle wheel on which they are being utilized. There shown is a heavy vehicle wheel rim 11 with a tire 13 mounted thereon. The wheel cover assembly includes a wheel cover portion 15 which is formed to overlie the external surface of the wheel rim and a hub cover 17 for the center of the assembly. The hub cover can be integrated or made a part of the wheel cover in some applications as illustrated in FIG. 1, or can be an independent element as illustrated in FIGS. 2 and 3. A universal retainer ring 19 is formed to engage a variety of different make wheel rims by attachment to the wheel lug bolts 21 or lug nuts 23. In some cases, the adapter ring is disposed between the wheel cover and the wheel rim (FIGS. 1, 3 and 6) and in other cases between the wheel cover and the hub cover (FIGS. 2, 4 and 5).

The separate wheel cover 15 is formed to cover the external surface of a heavy vehicle wheel rim 11 and has a circular opening in the center thereof to permit access to the wheel hub. A multiplicity of holes surround the opening in the wheel cover and permit the projection of the lug bolts 21 therethrough. The wheel cover has an outer diameter which coincides with the wheel rim diameter and is adapted for use with either 16- or 16.5-inch wheels.

Figure 6:
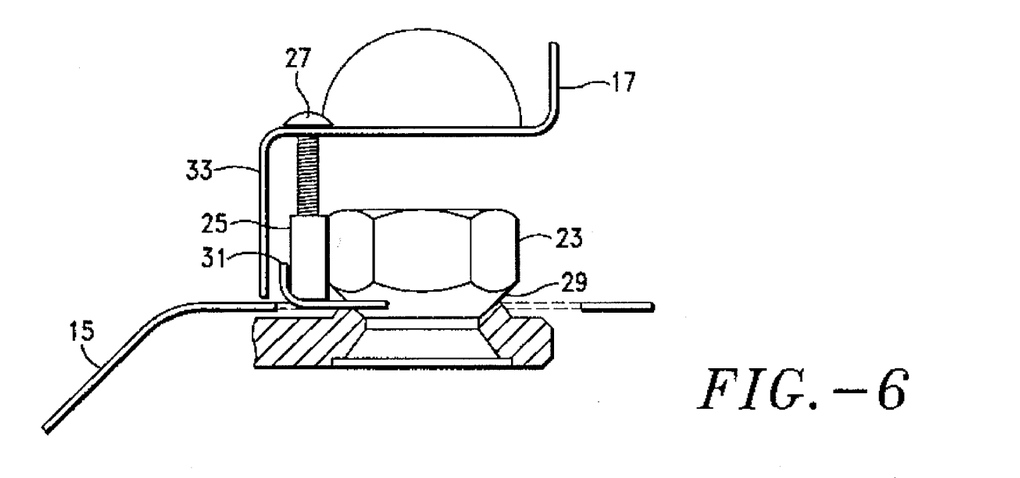
FIG. 6 is an alternative assembly to FIG. 4 showing the wheel cover engaged with a 1983 and earlier Ford wheel.

FIGS. 1 and 3 show the assembly arrangement illustrated in broken out FIG. 6 wherein the retainer ring 19 is first placed on the wheel rim 11 over lug nuts 23 before the wheel cover 15 is placed in position. In the arrangement illustrated in FIG. 6, which is used for 1983 and earlier Ford trucks utilizing 16- or 16.5-chamfered or beveled edge of the lug nut and the wheel cover is then placed over the wheel rim.

The retainer ring 19 is provided with a pair of screw receptacles 25 whereby when the hub cover 17 is placed over the center of the wheel rim 11 and screws 27 are inserted through the hub cover to engage the retainer ring, the tightening of the screws tightens the hub cover onto the wheel rim. In the assembly arrangements illustrated in FIGS. 4 and 6, the tightening of the screws draws the retainer ring up tight under the chamfered sides 29 of the lug nuts 23. The screw receptacles in the preferred embodiment of the invention are cylindrical pots or sleeves welded to the retainer ring. The peripheral edge of the retainer ring is bent into a perpendicularly projecting flange 31 for strength.

The wheel cover assembly illustrated In FIG. 1 has an integrated or one-piece wheel cover hub cover 15/17 which is held in place by the screws 27 which pass through the hub cover portion and engage the retainer ring 19. In the wheel cover 17 assemblies of FIGS. 2 and 3, the hub cover is a separate unit from the wheel cover 15. The separate hub cover has a peripheral wall 33 which in operative position projects inward toward the retainer ring whereby the center portion of the wheel cover which in operative position lies parallel the plane of the wheel is trapped between the circumferential edge or peripheral wall of the hub cover and the surface of the wheel rim holding the wheel cover firmly in place on the wheel.

FIG. 2 of the drawings illustrates the alternative assembly arrangement illustrated in broken out FIGS. 4 and 5 where the wheel cover 15 is first placed over the wheel rim 11 before the retainer ring 19 is engaged with either the lug nuts 23, in the case of 16- and 16.5-inch General Motors wheels as illustrated in FIG. 4, or the retaining ring is engaged with the free end of the lug bolts 21 in the case of 16-inch 1984 and later Ford vehicles or 16-inch 1994 and later Dodge wheels as illustrated in FIG. 5.

When the retainer ring 19 is engaged underneath the beveled surface 29 of the chamfered sides of the lug nut 23 as illustrated in FIGS. 4 and 6, the retainer ring does not lock onto the lug nuts until the hub cover 17 is engaged to the retainer ring by the screws 27 and hub cover is pulled tight. The tension in the screws holds the retainer in place on the lug nuts.

In the assembly arrangement illustrated in FIG. 5, the retainer ring 19 is engaged with the screw threads on the free ends of the lug bolts 21. After the wheel cover 15 has been placed over the lug nuts 23, the retainer ring is rotated into contact with the threads and held in contact therewith by the cam locks 35. As with the other assemblies, the hub cover 17 bears against the wheel cover in the same manner to hold it in place.

The cam locks 35, in the preferred embodiment of the invention, are made from stamped and folded sheet metal. A tab portion 37 is secured to the retainer ring 19 and extends from a connected vertical wall 39 portion that permits the top portion 41 of the cam lock to extend over the free end of the screw receptacles 25. The top portions of the cam locks include a pair of registration holes 43. The cam locks also include a projecting engagement portion 45 which engages a lug nut 23 or the threads of a lug bolt 21. In the preferred embodiment, the projecting portion of the cam lock is connected to the top portion by a vertical wall 47 similar to the one which connects the tab portion to the top portion. This configuration permits the projecting portion of the cam lock to be disposed in close proximity to the retainer ring since the length of the chamfered sides 29 of the lug nuts and the free ends of the lug bolts are quite short for the engagement portion to contact, and the engagement needs to be accomplished close to the contact made therewith by the retainer ring.

The cam locks 35 are secured to the retainer ring 19 with pivot connections, such as rivets, whereby the cams can be swivelled about the pivot connections. The two registration holes 43 permit the cam locks to be secured in two alternative engagement positions when the hub cover securement screws 27 are screwed into the screw receptacles 25. In one position, the projecting engagement portion 45 of the cam locks engage the screw threads of a lug bolt 21 and, in the other position, the cam lock engages the chamfered side 29 of a lug nut 23. It is a unique feature of the present invention that the same screws which hold the hub cover in place in the assembly also lock the cam locks in proper registration, and the hub cover provides further security by preventing the cam locks from rotating out of registration when the hub cover is in proper position.

The configurations of the retainer ring openings 49, in the case of the assemblies illustrated in FIGS. 4 and 6, permit the retainer ring to be installed over the lug nuts 23 and pushed in close to the wheel rim 11 at which point the ring can be rotated to engage the chamfered sides 29 of the lug nuts due to the unique configuration of the openings. Alternatively, in the case of the assemblies illustrated in FIG. 5, the retainer ring 19 is rotated until it engages the threads of the free end of the lug bolts 21. The cam locks 35 are then rotated to hold the retainer ring in position in the assemblies illustrated In FIGS. 4–6.

Figure 7:
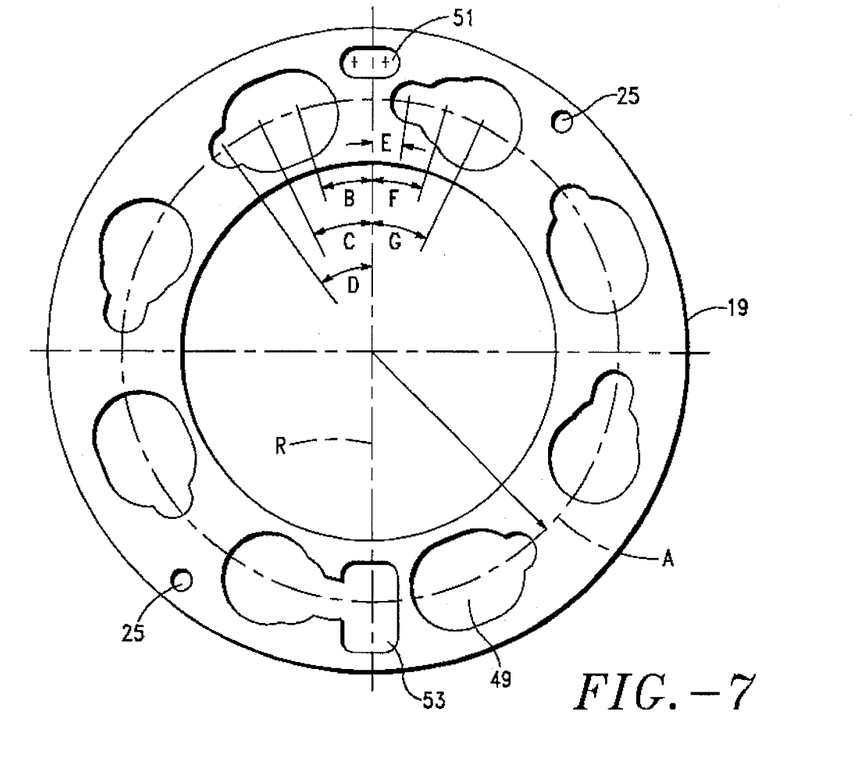
FIG. 7 is a top plan view of the retainer ring of the present invention without the cam lock.

FIG. 7 illustrates the variety of different configuration holes 49 which permit the retainer ring 19 or ring disk to accomplish the alternative grasping capabilities. The openings formed therein are equally spaced in eight locations to fit around the lug bolts 21. All of the openings permit the retainer ring to fit over the lug nuts 23 and to engage the lug bolts. Once the retainer ring is rotated into engagement and the cam locks 35 are in turn rotated to bear against either the lug nut or the lug bolt and hold the ring in engagement therewith, the hub cover 17 is placed over the retainer ring. The screws 27 and the peripheral edge of the hub cover prevent the cams from rotating out of locking engagement with the bolts or nuts.

The multiplicity of adapter openings 49 formed in the universal retainer ring 19 are arranged in a circular pattern to provide securement to a multiplicity of truck wheel lug bolt and nut patterns. The openings include four generally oval-shaped, equally spaced openings interspersed by four generally truncated teardrop shaped equally spaced openings and two diametrically opposed openings.

The eight equally spaced openings are arranged on a circular centerline and have an outline at one end thereof on the centerline which permits fitting the ring disk over the lug nuts of the wheel bolt pattern and an outline at the other end of at least some of the openings, also on the centerline thereof, which permits fitting said ring disks into engagement with the threads of a lug bolt. The two diametrically opposed openings are unimportant to the invention and simply accommodate locator pins on some of the wheel designs. All of the eight openings must permit the retainer ring to fit over the lug nuts, but only some, preferably at least four, of the openings must have outlines that engage wheel bolt threads. In the preferred embodiment, all eight openings are provided with the necessary end outlines to provide the capability.

At least some of the opening outlines have an intermediate outline, disposed between said end outlines, which engage the chamfered sides of lug nuts when those portions of the openings are rotated into engagement therewith. These are the alternately spaced generally teardrop shaped openings. Four of them are sufficient to engage the lug nuts to hold the retainer ring and wheel cover in place. The generally oblong or oval shaped openings are not designed to engage the lug nuts but could be.

The parameters of the two different type openings, the oval and the truncated teardrop, are formulated with reference to one of each of the different types disposed on opposite sides of a reference line R drawn through the two diametrically opposed openings and the center of the retainer ring. The eight equally spaced openings in the retainer ring are all spaced on a 3.250-inch radius centerline A and each of the two different openings is comprised of a multiple of different diameter openings which are integrated to form the oval shape or the truncated teardrop shape. All of the eight openings have at one end a smallest diameter outline with a 0.270-inch radius and at the other end an outline with a 0.600-inch radius. Each of the eight openings, between the two end portion outlines of each opening, includes an intermediate radius shaped opening which in the oval shaped opening is also a 0.600-inch radius like the end outline, also centered on the circular centerline, while in the teardrop shaped opening the intermediate radius outline has a 0.460-inch radius centered on the circular centerline.

In the oval shaped opening, one of the 0.600-inch radius openings is located at angle B, 19.5 degrees from the reference line R while the second opening, which is integrated with the first one, is located at angle C, 25.5 degrees from the reference line while the center of generation of the small end outline is located at angle D, 35.5 degrees from the reference line.

The truncated teardrop shape openings are located on the opposite side of the reference line R with the smallest radius outline being located at angle E, 9.5 degrees from the reference line and with the intermediate center outline of 0.460-inch radius being located at angle F, 19.5 degrees from the reference line, and the outline with the 0.600-inch radius being located at angle G, 25.5 degrees from the reference line.

The outlines of the openings are all blended with tangent lines to ensure that there are no internal projections which would interfere with the rotation of the retainer ring 19 on the lug bolts 21 or nuts 23 when it is rotated into position against either of them for securement and held there by means of the cam locks 35. Each of the two different openings is reproduced at 90 degrees from the other similar openings whereby there are a total of eight openings all located on 45-degree centers around the retainer ring. The receptacles 25 for the screws 27 which hold the hub covers 17 to the retainer ring are located at opposite positions across the retainer ring on a line through the center thereof.

The two opposed holes at opposite ends of the reference line R are different in configuration. One of the holes is an oblong opening located with a centerline at 3.745 inches from the center of the retainer ring and is comprised of a pair of holes located at 0.196 inches on opposite sides of the reference line R with 0.220-inch radii and with tangent lines at the outer and inner circumferences. The opposite opening 53 is generally rectangular and integrated into one of the teardrop openings with the outer edge thereof disposed 0.716 inches from the 3.25-inch center line radius of all of the openings. The opening is 0.764 inches wide, equally disposed on opposite sides of the reference line, and is 1.230 inches high. The height extends 0.716 inches out from the circular center line A of the openings. The corners of that opening are rounded to eliminate stress concentration points in the ring. These openings accommodate locator pins formed on different make wheel rims and brake drums.

The retainer ring 19 of the present invention provides the ability to secure wheel cover assemblies to a wide range of wheel bolt patterns without interfering with the wheel rim 11 to lug bolt 21 integrity while permitting the removal of a wheel cover 15 without removing the lug nuts 23.

Thus it will be apparent from the foregoing description of the invention in its preferred form that it will fulfill all the objects and advantages attributable thereto. While the wheel cover assembly of the present invention has been described in considerable detail herein, the invention is not to be limited to such details as have been set forth except as may be necessitated by the appended claims.

We claim:

1. A retainer ring for attaching wheel cover assemblies to vehicle wheel rims which mount on lug bolts and are held in place by lug nuts comprising     a generally flat ring disk formed for engaging alternatively either the chamfered sides of lug nuts or the free ends of lug bolts of a multiplicity of wheel bolt patterns, cam locks for holding said ring disk in engagement with said lug bolts or nuts, and means for securing a wheel cover assembly to said ring disk.

2. The retainer ring of claim 1 wherein said openings have an outline at one end thereof along said circular centerline which permits fitting said ring disk over said lug nuts and an outline on said centerline at the other end thereof in at least some of said openings which permits fitting said ring disk into engagement with the threads of a lug bolt, and at least some of said openings having an intermediate outline disposed between said end outlines which engages said chamfered sides of lug nuts when said portions of said openings are rotated into engagement therewith.

3. The retainer ring of claim 2 wherein all of said openings have an outline at one end thereof on said centerline for fitting over a lug nut and an opening outline at the other end thereof on said centerline for engaging a lug bolt, and every other opening includes an intermediate outline on said centerline for engaging the chamfered edge of a lug nut.

4. The retainer ring of claim 3 wherein said openings are formulated with reference to line drawn through the center of said ring, a first configuration of opening disposed on one side of said reference line and having a 0.600-inch radius end and intermediate outlines located at 19.5 and 25.5 degrees respectively along said centerline from said reference line, and a 0.270-inch radius end outline located at 35.5 degrees along said centerline from said reference line, a second configuration of opening disposed on the opposite side of said reference line and having a 0.270-inch radius end outline located at 9.5 degrees along said centerline from said reference line, a 0.460-inch radius intermediate outline located at 19.5 degrees along said centerline from said reference line, and a 0.600-inch radius end outline located at 25.5 degrees along said centerline from said reference line, said opening outlines being blended by tangent lines whereby there are no portions of said opening outlines projecting inwardly into said openings.

5. The retainer ring of claim 1 wherein said cam locks are held against unlocking by a hub cover secured to said retainer ring.

6. A retainer ring for attaching wheel cover assemblies to vehicle wheel rims which mount on lug bolts and are held in place by lug nuts comprising a generally flat ring disk formed for engaging alternatively either the chamfered sides of lug nuts or the free ends of lug bolts of a multiplicity of wheel bolt patterns, wherein said ring disk is provided with a multiplicity of openings disposed on a circular centerline which permit said ring disk to either be rotated into conforming engagement with approximately one-half of the diameter of the free ends of the lug bolts which a vehicle wheel is mounted on and to engage the threads thereof or be inserted over the lug nuts and then rotated to engage the chamfered sides of a lug nut and be captured under the peripheral edges of said nuts cam locks for holding said ring disk in engagement with said lug bolts or nuts, and means for securing a wheel cover assembly to said ring disk.

7. The retainer ring for attaching wheel cover assemblies to vehicle wheel rims which mount on lug bolts and are held in place by lug nuts comprising a generally flat ring disk formed for engaging alternatively either the chamfered sides of lug nuts or the free ends of lug bolts of a multiplicity of wheel bolt patterns, said ring disk including a multiplicity of openings disposed on a circular centerline which permit said ring disk to either be rotated into conforming engagement with approximately one-half of the diameter of the free ends of the lug bolts which a vehicle wheel is mounted on and to engage the threads thereof or be inserted over the lug nuts and then rotated to engage the chamfered sides of a lug nut and be captured under the peripheral edges of said nuts, said openings having an outline at one end thereof along said circular centerline which permits fitting said ring disk over said lug nuts and an outline on said centerline at the other end thereof in at least some of said openings which permits fitting said ring disk into engagement with the threads of a lug bolt, least some of said openings having an intermediate outline disposed between said end outlines which engages said chamfered sides of lug nuts when said portions of said openings are rotated into engagement therewith, all of said openings have an outline at one end thereof on said centerline for fitting over a lug nut and an opening outline at the other end thereof on said centerline for engaging a lug bolt, and every other opening includes an intermediate outline on said centerline for engaging the chamfered edge of a lug nut, cam locks for holding said ring disk in engagement with said lug bolts or nuts, a hub cover secured to said retainer ring and holding said cam locks against unlocking, and means for securing a wheel cover assembly to said ring disk from said reference line.

8. A wheel cover assembly for a vehicle wheel rim which mounts on lug bolts and is held in place by lug nuts comprising a universal retainer ring which has a multiplicity of adapter openings formed in a circular pattern to permit said ring to engage a multiplicity of truck or wheel lug bolt and nut patterns without being captured between a lug nut and said wheel rim, said ring including pivotable cam locks to hold said ring in engagement with said lug bolts or nuts, and a hub cover which is engaged to said retainer ring by screws and holds said cam locks from unlocking.

9. The wheel cover assembly of claim 8 including a wheel cover for the external surface of a wheel rim and having a circular opening in the center thereof with a multiplicity of holes surrounding said opening to permit the projection of said lug bolts therethrough, and said wheel cover being held in position on said wheel rim by said hub cover bearing on said wheel cover when said screws are tightened into said ring.

10. The wheel cover assembly of claim 8 wherein the retainer ring engages the chamfered sides of at least a portion of said lug nuts and said hub cover bears against said wheel cover to hold it in position on said wheel rim.

11. The wheel cover assembly of claim 8 wherein the retainer ring engages the threads of said lug bolts and said hub cover bears against said wheel cover to hold it in position on said wheel rim.

12. The wheel cover assembly of claim 8 wherein the adapter openings are disposed on a circular centerline which permits said ring disk to either be rotated into conforming engagement with approximately one-half of the diameter of the free ends of the lug bolts which a vehicle wheel is mounted on and to engage the threads thereof or be inserted over the lug nuts and then rotated to engage the chamfered sides of a lug nut and be captured under the peripheral edges of said nuts.

13. The retainer ring of claim 8 wherein said cam locks are held in registration securing said retainer ring in position on said lug nuts or said lug bolts by said screws which engage said hub cover to said retainer ring.

14. A wheel cover assembly for a vehicle wheel rim which mounts on lug bolts and is held in place by lug nuts comprising

- a universal retainer ring which has a multiplicity of adapter openings formed in a circular pattern to permit said ring to engage a multiplicity of truck or wheel lug bolt and nut patterns without being captured between a lug nut and said wheel rim, said openings being disposed on a circular centerline which permits said ring disk to either be rotated into conforming engagement with approximately one-half of the diameter of the free ends of the lug bolts which a vehicle wheel is mounted on and to engage the threads thereof or be inserted over the lug nuts and then rotated to engage the chamfered sides of a lug nut and be captured under the peripheral edges of said nuts, pivotable cam locks secured to said ring to hold said ring in engagement with said lug bolts or nuts, a hub cover which is engaged to said retainer ring by screws and holds said cam locks from unlocking, said cam locks being held in registration securing said retainer ring in position on said lug nuts or said lug bolts by said screws which engage said hub cover to said retainer ring, and a wheel cover for the external surface of a wheel rim and having a circular opening in the center thereof with a multiplicity of holes surrounding said opening to permit the projection of said lug bolts therethrough, said wheel cover being held in position on said wheel rim by said hub cover bearing on said wheel cover when said screws are tightened into said ring.

\* \* \* \* \*

UNITED STATES PATENT AND TRADEMARK OFFICE
CERTIFICATE OF CORRECTION

PATENT NO. : 5,542,750
DATED : August 6, 1996
INVENTOR(S) : David J. FitzGerald

It is certified that error appears in the above-indentified patent and that said Letters Patent is hereby corrected as shown below:

The title page, showing an illustrative figure, should be deleted and substitute therefor the attached title page.

Signed and Sealed this

Eleventh Day of February, 1997

Attest:

BRUCE LEHMAN

*Attesting Officer*  *Commissioner of Patents and Trademarks*

United States Patent [19]
FitzGerald

[11] Patent Number: 5,542,750
[45] Date of Patent: Aug. 6, 1996

[54] WHEEL COVER ASSEMBLY RETAINER RING

[75] Inventor: David J. FitzGerald, San Leandro, Calif.

[73] Assignee: Wheelmasters, Inc., Reno, Nev.

[21] Appl. No.: 249,543

[22] Filed: May 26, 1994

[51] Int. Cl.$^6$ ............................................. B60B 7/14
[52] U.S. Cl. ........................... 301/37.37; 321/37.31; 321/108.4
[58] Field of Search ..................... 301/37.1, 37.21, 301/37.31, 37.37, 108.1, 108.4, 35.62

[56] References Cited

U.S. PATENT DOCUMENTS

| Re. 33,806 | 1/1992 | Wang et al. | |
|---|---|---|---|
| 4,606,582 | 8/1986 | Warren | 301/37.37 |
| 4,725,100 | 2/1988 | Patti | |
| 4,925,249 | 5/1990 | Auspelmyer | 301/35.62 X |
| 5,031,965 | 7/1991 | Bueger | 301/37.37 |
| 5,052,758 | 10/1991 | Patti et al. | |
| 5,167,440 | 12/1992 | FitzGerald | |

FOREIGN PATENT DOCUMENTS

| 2451071 | 4/1976 | Germany | 301/37.37 |
|---|---|---|---|
| 4085102 | 3/1992 | Japan | 301/37.31 |
| 2224702 | 5/1990 | United Kingdom | 301/37.31 |

*Primary Examiner*—Russell D. Stormer
*Attorney, Agent, or Firm*—David H. T. Wayment

[57] ABSTRACT

A retainer ring for wheel cover assemblies for heavy vehicle wheel rims which mount on lug bolts and are held in place by lug nuts including a universal retainer ring which has a multiplicity of adaptor openings to engage a variety of lug bolt and nut patterns and without removal of lug nuts and is secured in place by cam locks.

14 Claims, 3 Drawing Sheets

UNITED STATES PATENT AND TRADEMARK OFFICE
CERTIFICATE OF CORRECTION

PATENT NO. : 5,542,750
DATED : August 6, 1996
INVENTOR(S) : David J. FitzGerald

It is certified that error appears in the above-indentified patent and that said Letters Patent is hereby corrected as shown below:

In figures 2 and 3, sheet 1, reference numeral 37 should be canceled.

Figure 8:
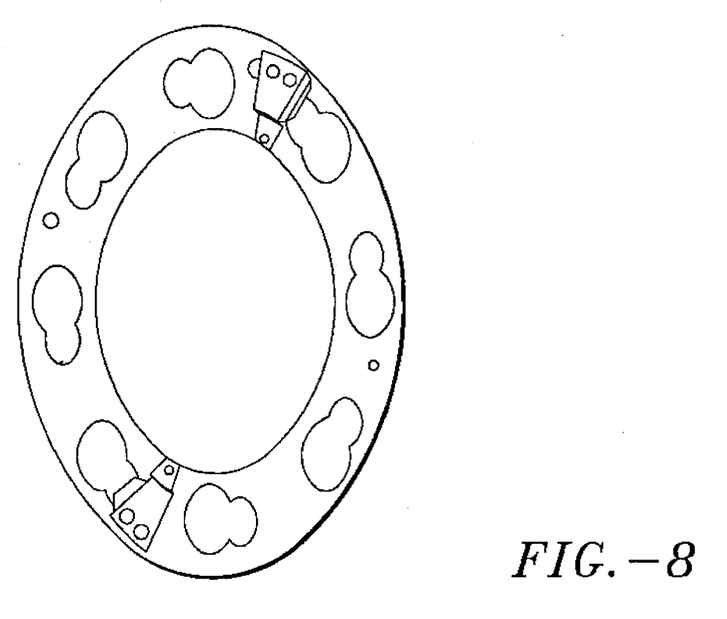
FIG. 8 is a perspective view of the retainer ring of FIG. 7 showing the cam action clips which hold the retainer ring on the lug nuts or bolts.

In figure 8, sheet 3, various reference numerals should be added as shown below: